United States Patent
Liu et al.

(10) Patent No.: US 10,411,352 B2
(45) Date of Patent: Sep. 10, 2019

(54) ANTENNA TUNING SYSTEM AND METHOD THEREOF

(71) Applicant: ACCTON TECHNOLOGY CORPORATION, Hsinchu (TW)

(72) Inventors: I-Ru Liu, Taipei (TW); Wen-Pin Lo, Taipei (TW); Hsin-Hsiung Kang, Taipei (TW); Yang-Te Fu, Taichung (TW); Chang-Cheng Liu, Hsinchu County (TW); Yen-Lin Liao, Miaoli County (TW); Yi-Chang Chen, Taoyuan (TW); Li-Hua Chou, New Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 103 days.

(21) Appl. No.: 15/627,436

(22) Filed: Jun. 19, 2017

(65) Prior Publication Data

US 2018/0175503 A1    Jun. 21, 2018

(30) Foreign Application Priority Data

Dec. 21, 2016   (TW) .............................. 105142535 A

(51) Int. Cl.
| | |
|---|---|
| H04M 3/16 | (2006.01) |
| H01Q 5/385 | (2015.01) |
| H01Q 3/24 | (2006.01) |
| H01Q 19/32 | (2006.01) |
| H04B 17/318 | (2015.01) |

(52) U.S. Cl.
CPC ............. *H01Q 5/385* (2015.01); *H01Q 3/247* (2013.01); *H01Q 19/32* (2013.01); *H04B 17/318* (2015.01)

(58) Field of Classification Search
CPC ......... H01Q 5/385; H01Q 3/247; H01Q 19/32
See application file for complete search history.

(56) References Cited

U.S. PATENT DOCUMENTS

| | | | |
|---|---|---|---|
| 5,767,807 A * | 6/1998 | Pritchett | H01Q 3/24 342/374 |
| 6,915,120 B2 | 7/2005 | Ichihara | |
| 6,987,493 B2 | 1/2006 | Chen | |
| 7,242,366 B2 | 7/2007 | Shibata | |
| 8,514,130 B1 * | 8/2013 | Jensen | H01Q 3/446 342/367 |
| 2008/0309555 A1 * | 12/2008 | Fan | H04B 17/26 342/372 |
| 2011/0080325 A1 * | 4/2011 | Livneh | H01Q 3/26 343/702 |
| 2014/0313080 A1 * | 10/2014 | Smith | H01Q 3/00 342/372 |
| 2016/0218785 A1 * | 7/2016 | Cho | H01Q 19/32 |
| 2016/0337025 A1 * | 11/2016 | Xu | H01Q 1/243 |
| 2018/0175503 A1 * | 6/2018 | Liu | H01Q 5/385 |

* cited by examiner

*Primary Examiner* — Md K Talukder
(74) *Attorney, Agent, or Firm* — CKC & Partners Co., LLC

(57) ABSTRACT

The present invention discloses an antenna tuning system and method thereof. The method comprises the following steps: choosing a parasitic antenna that combined with a main antenna, the strongest received signal strength indicator of a target station is detected; controlling the selected parasitic antenna that combined with a main antenna, to generate a scattering resonance through turning on or off a switch unit; and controlling a diffraction radiation pattern between the main antenna and the selected parasitic antenna through adjusting a load of a designed circuit.

6 Claims, 5 Drawing Sheets

ANTENNA TUNING SYSTEM AND METHOD THEREOF

RELATED APPLICATIONS

This application claims priority to Taiwan Application Serial Number 105142535, filed Dec. 21, 2016, which is herein incorporated by reference.

BACKGROUND

Field of Invention

The present invention relates to an antenna tuning system and method thereof.

Description of Related Art

In the existing technology, when a general directional antenna is configured, the direction of the general directional antenna is fixed; accordingly, the fading caused by multipath will be not solved. The antenna supporting MIMO system is developed, and the Omni-antenna is chosen. The Omni-antenna has the advantage of covering greater angles; however, the Omni-antenna still cannot solve the interference caused by the rogue stations.

SUMMARY

The present invention provides an antenna tuning system. The antenna tuning system uses various design circuits containing reactive loads to form different antenna resonance effect so as to generate different antenna radiation pattern. Accordingly, the antenna tuning system uses a specific antenna radiation pattern to concentrate energy in the direction of a target station so as to avoid wasting energy on the station which is not allowed to send or the rogue stations which is unauthorized.

An aspect of the disclosure is to provide an antenna tuning system, which is adapted for adjusting a composite radiation pattern generated by a main antenna cooperating with at least one parasitic antenna. The antenna tuning system comprises a processor, at least one designed circuit, and at least one switch unit. The processor is connected to the main antenna and the each of the at least one parasitic antenna, wherein the processor chooses a first parasitic antenna of the at least one parasitic antenna, wherein a greatest received signal strength indicator (RSSI) is detected between a target station and the first parasitic antenna cooperating with the main antenna. The least one designed circuit is connected to the at least one parasitic antenna one by one or individually, wherein the designed circuit is connected to the processor, and the designed circuit controls the composite radiation pattern generated by the main antenna cooperating with the parasitic antenna. The at least one switch unit is connected to the at least one designed circuit individually and connected to the processor, wherein the processor controls the switch unit to turn on or turn off the connection between the designed circuit and the related parasitic antenna of the designed circuit.

In one embodiment of the present invention, wherein the processor further comprises a transceiver unit and a control unit. The transceiver unit detects the RSSI between the antenna tuning system and the target station individually. The control unit is coupled to the transceiver unit, wherein the control unit chooses the first parasitic antenna according to the RSSI, and the control unit also controls a first switch unit which is connected to the first parasitic antenna in order to let the first switch unit to turn on the first parasitic antenna, so as to control the main antenna and the first parasitic antenna to resonate.

In one embodiment of the present invention, the processor further comprises a power unit. The control unit drives the power unit to provide power to the switch unit.

In one embodiment of the present invention, the composite radiation pattern generated by the main antenna cooperating with each of the at least one parasitic antenna becomes an omni-directional antenna mode when the control unit turns off every switch unit which is connected to every corresponding parasitic antenna.

In one embodiment of the present invention, the designed circuit further comprises a reactive load. The control unit controls the power unit to provide a first voltage and a second voltage to the switch unit in order to control the switch unit, the first voltage is indirectly provided to the switch unit through the designed circuit, the second voltage is directly provided to the switch unit, and whether the switch unit is turned on or turned off is determined by the first and the second voltage, when the reactive load is an inductive load, the composite radiation pattern belongs to an inductive load mode.

In one embodiment of the present invention, the designed circuit further comprises a reactive load. The control unit controls the power unit to provide a first voltage and a second voltage to the switch unit in order to control the switch unit, the first voltage is indirectly provided to the switch unit through the designed circuit, the second voltage is directly provided to the switch unit, and whether the switch unit is turned on or turned off is determined by the first and the second voltage, when the reactive load is a capacitive load, and the composite radiation pattern belongs to a capacitive load mode.

An aspect of the disclosure is to provide an antenna tuning method, which is adapted for adjusting a composite radiation pattern generated by a main antenna cooperating with at least one parasitic antenna. The antenna tuning method comprises the following steps: choosing a first parasitic antenna of the at least one parasitic antenna, wherein a greatest RSSI is detected between a target station and the first parasitic antenna cooperating with the main antenna; providing at least one designed circuit, connecting to the at least one parasitic antenna individually, wherein the designed circuit controls the composite radiation pattern generated by the main antenna cooperating the parasitic antenna; and providing at least one switch unit, connected to the at least one designed circuit individually, and controlling the switch unit to turn on or turn off the connection between the designed circuit and the related parasitic antenna of the designed circuit.

In one embodiment of the present invention, the antenna tuning method further comprises the step of driving a power unit to provide power to the switch unit in order to control the switch unit to turn on or turn off the connection between the designed circuit and the related parasitic antenna of the designed circuit.

In one embodiment of the present invention, the composite radiation pattern generated by the main antenna cooperating with all parasitic antennas being dumb or inactive becomes an omni-directional antenna mode if turning off all the switch units which are connected to all the respective parasitic antennas.

In one embodiment of the present invention, the antenna tuning method further comprises the steps of providing a reactive load to the designed circuit; providing a first voltage and a second voltage from the power unit to the switch unit to control the switch unit, wherein the first voltage is indirectly provided to the switch unit through the designed circuit, the second voltage is directly provided to the switch unit, and whether the switch unit is turned on or turned off is determined by the first and the second voltage; when the reactive load is an inductive load, the composite radiation pattern generated by the main antenna cooperating the parasitic antenna belongs to an inductive load mode; and when the reactive load is a capacitive load, the composite radiation pattern generated by the main antenna cooperating with the parasitic antenna belongs to a capacitive load mode.

An aspect of the disclosure is to provide an antenna tuning system, which is adapted for adjusting a composite radiation pattern generated by a main antenna cooperating with at least one parasitic antenna. The antenna tuning system comprises a processor, at least two designed circuit, and at least two switch unit. The processor is connected to the main antenna and each of the at least one parasitic antenna, wherein the processor chooses a first parasitic antenna of the at least one parasitic antenna, wherein a greatest received signal strength indicator (RSSI) is detected between a target station and the first parasitic antenna cooperating with the main antenna. The at least two designed circuit are connected to each of the at least one parasitic antenna, the at least two designed circuit are also connected to the processor, the at least two designed circuit control the composite radiation pattern generated by the main antenna cooperating with the parasitic antenna, and the at least two designed circuit at least have a capacitive load and a inductive load mode. The at least two switch unit are connected to each of the at least one parasitic antenna, wherein the processor controls the switch unit to turn on or turn off the connection between the designed circuit and the related parasitic antenna of the designed circuit.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
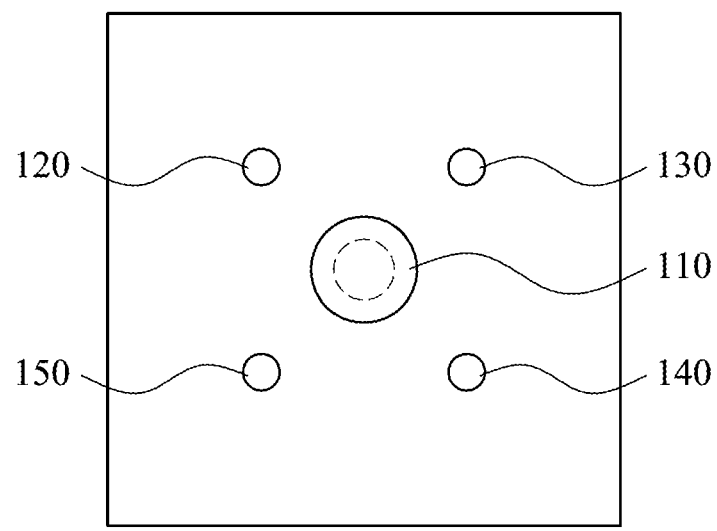
FIG. 1A and FIG. 1B are block diagrams for configurations of main antenna and a plurality of parasitic antennas of the antenna tuning system according to the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

The present invention discloses an antenna tuning system. The antenna tuning system uses a specific antenna radiation pattern to concentrate energy in the direction of a target station so as to avoid wasting energy on the station which is not allowed to send or the rogue stations.

Figure 1B:
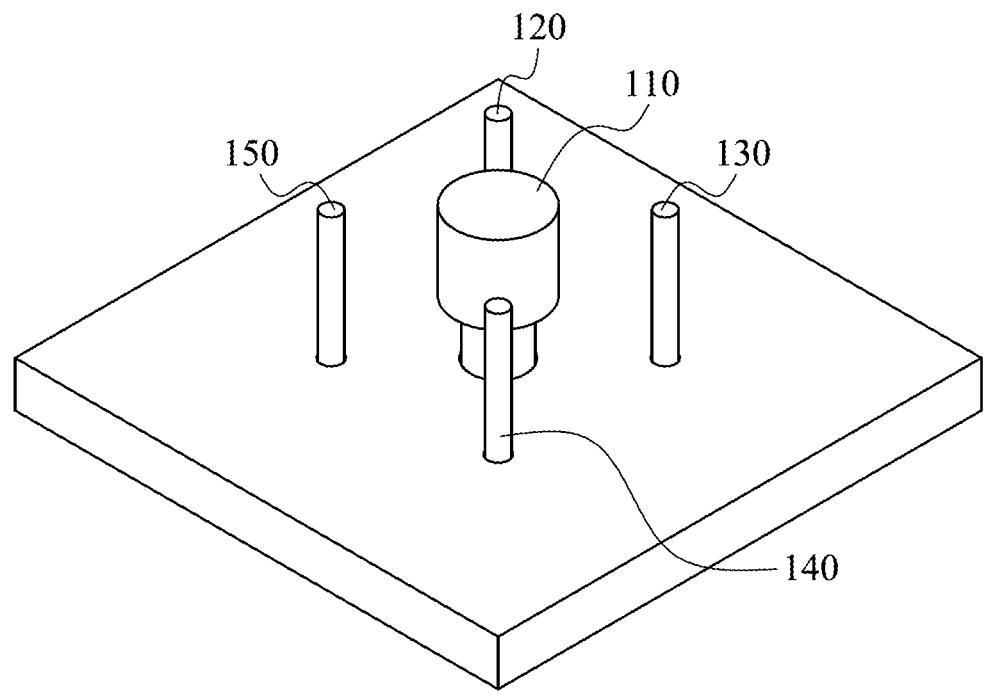

FIG. 1A and FIG. 1B are block diagrams for configurations of main antenna and a plurality of parasitic antennas of the antenna tuning system according to the first embodiment of the present invention. In FIG. 1A and FIG. 1B, four parasitic antennas 120, 130, 140, and 150 surround the main antenna 110. The main antenna 110 and the parasitic antennas 120, 130, 140, and 150 of the present invention are monopole antennas in the present embodiment. The distance between the main antenna 110 and the parasitic antennas 120, 130, 140, and 150 is quarter of the operating wavelength in the present embodiment. However, the actual planning is not limited thereto. The antenna tuning system of the present invention can determine that the radiation energy of the target station generated by different parasitic antennas cooperating with the main antenna 110. The antenna tuning system also chooses the related parasitic antenna having the greatest resonance effect so as to let the target station have the greatest communication power and the best communication quality.

The antenna tuning system of the present invention comprises a processor, at least one switch unit, and at least one designed circuit. The processor can be a computing system or any electronic device which has computing function. The switch unit can be a PIN diode. In the present embodiment, the designed circuit can be implemented by a bias circuit and a reactive load composed by a current-limiting resistor, a capacitance unit, and an inductance unit. The processor is connected to the main antenna 110. The processor is also connected to the parasitic antennas 120, 130, 140, and 150 through the designed circuits. The processor chooses one parasitic antenna from the parasitic antennas 120, 130, 140, and 150 to obtain the greatest RSSI for a target station. In the embodiment of the present invention, four switch units are connected to the parasitic antennas 120, 130, 140, and 150 individually. The processor makes each parasitic antenna is electrically connected the reactive load of the designed circuit through turning on or turning off each switch unit so as to control the main antenna 110 and the parasitic antennas 120, 130, 140, and 150 to resonate and also choose one parasitic antenna which can generate the greatest RSSI when the parasitic antenna affects together with the main antenna 110. The designed circuit is connected to the processor. The processor controls the radiation pattern between the main antenna and the selected parasitic antenna through adjusting load of the designed circuit.

Figure 2A:
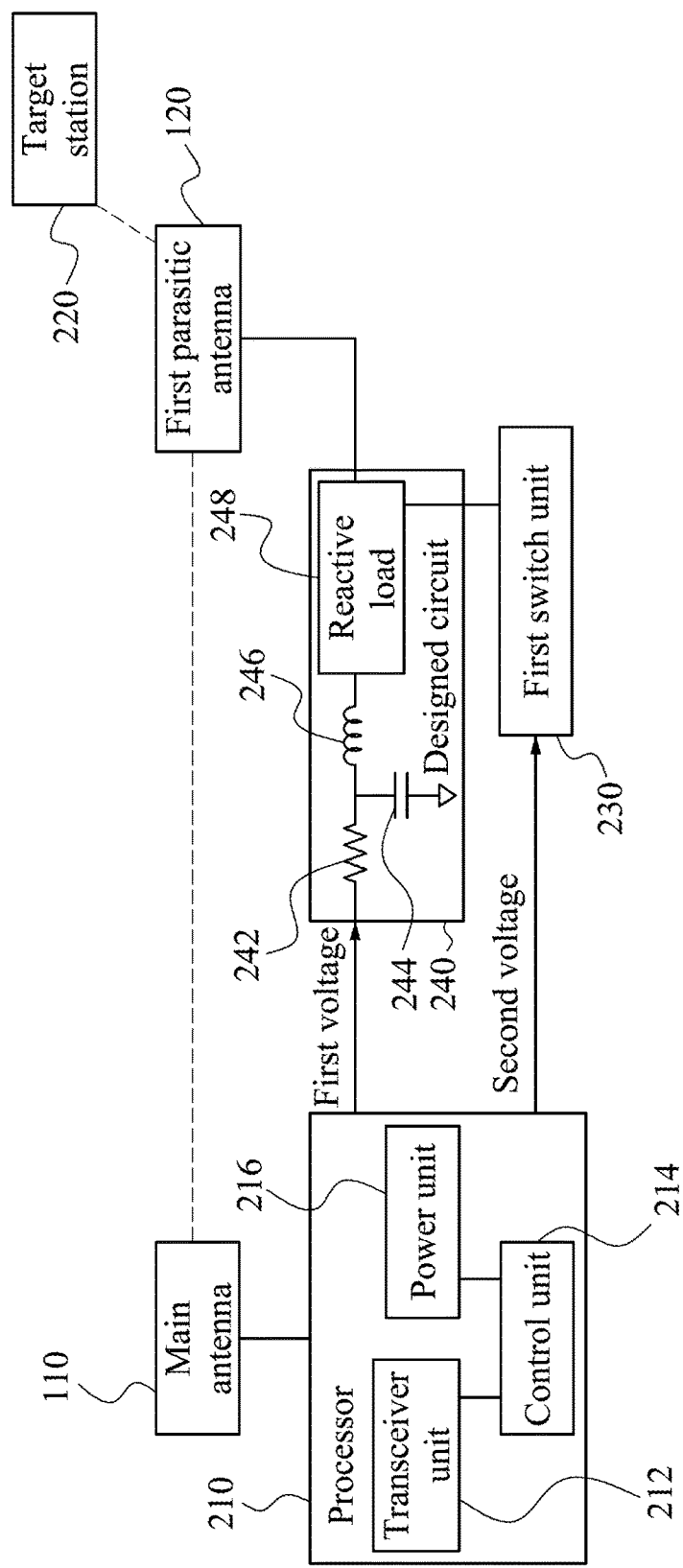
FIG. 2A is a block diagram of the antenna tuning system according to the first embodiment of the present invention.
Figure 2B:
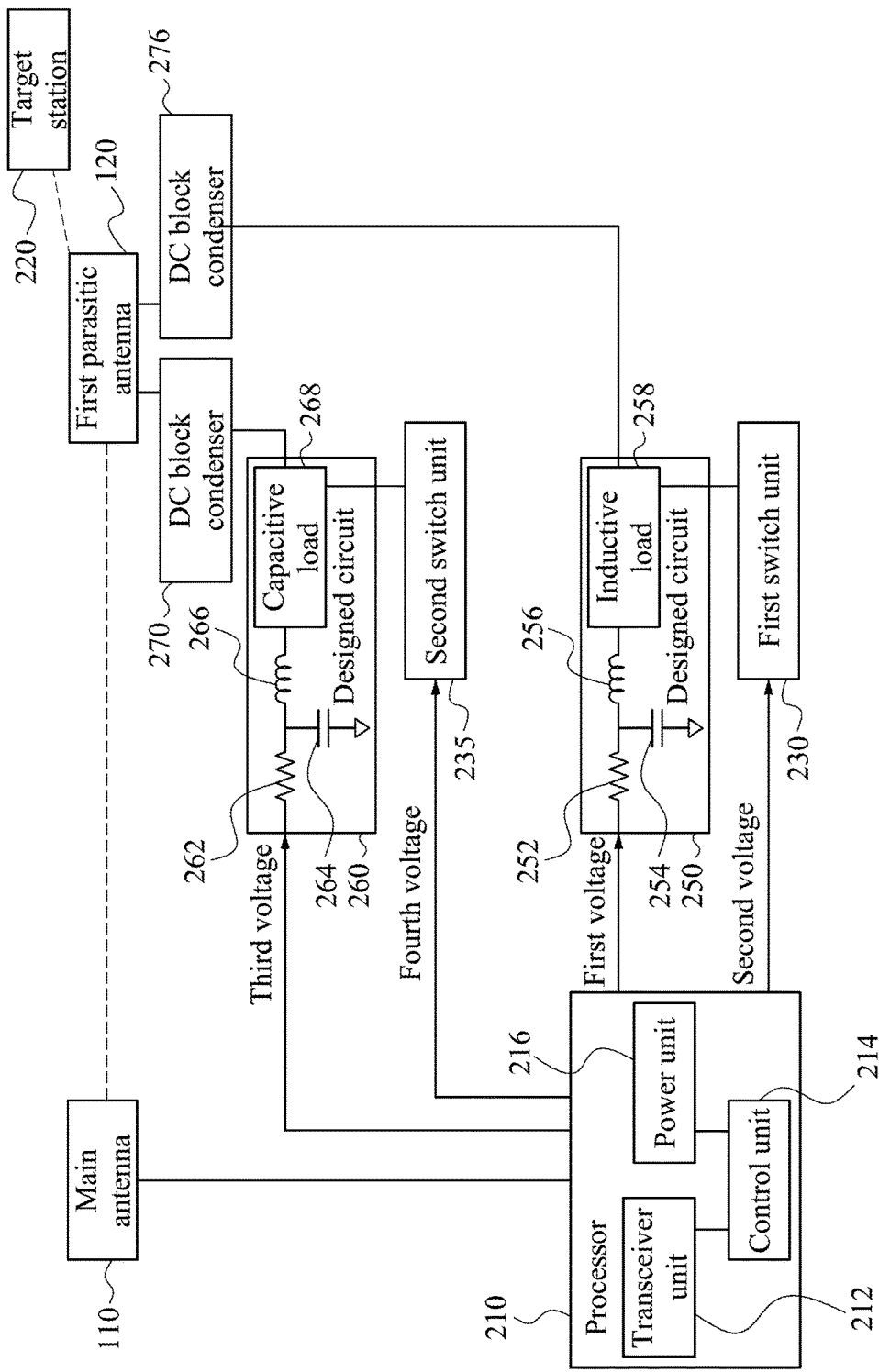
FIG. 2B is a block diagram of the antenna tuning system according to the second embodiment of the present invention.
Figure 3:
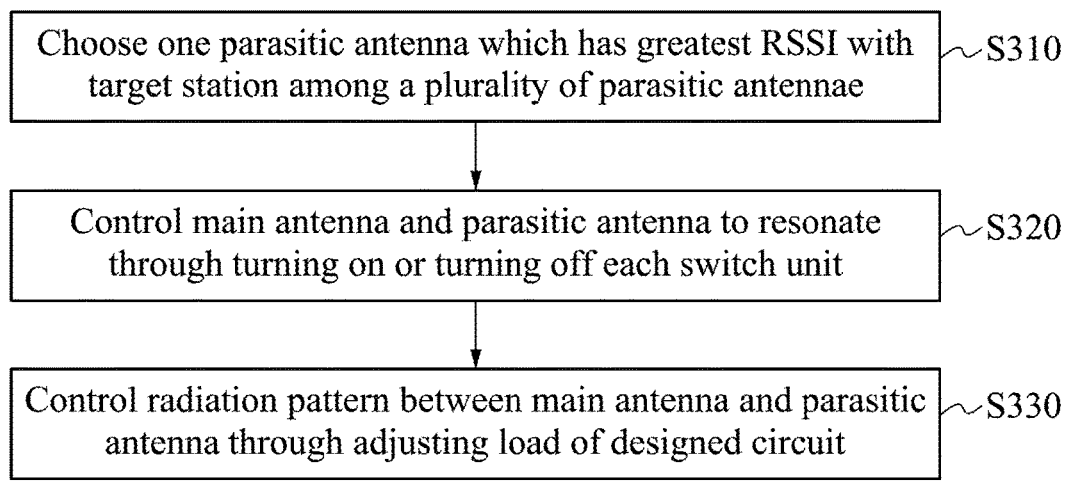
FIG. 3 is a flowchart of the antenna tuning method according to the first embodiment of the present invention.

FIG. 2A is a block diagram of the antenna tuning system according to the first embodiment of the present invention. FIG. 2B is a block diagram of the antenna tuning system according to the second embodiment of the present invention. FIG. 3 is a flowchart of the antenna tuning method according to the first embodiment of the present invention. The following descriptions illustrate the antenna tuning method through FIG. 2A and FIG. 3. The antenna tuning system of the present invention is adapted for adjusting the radiation pattern between the main antenna 110 and the parasitic antennas 120, 130, 140, and 150. The processor 210 is connected to the main antenna 110. The processor 210 chooses a first parasitic antenna (such like parasitic antenna 120 of FIG. 2A) of the plurality of parasitic antennas. For the target station 220, a greatest RSSI is detected if the parasitic antenna 120 and the main antenna 110 (Step S310). The processor 210 comprises a transceiver 212, a control unit 214, and a power unit 216, however, that is not limited thereto. The transceiver unit 212 can be a wireless module of the processor 210. The control unit 214 can be a circuit module with the logic operation function. The power unit 216 can be a power supply. In Step S310, the transceiver unit 212 detects each RSSI between the target station 220 and the main antenna 110 combing the parasitic antenna 120, 130, 140, and 150 respectively. The control unit 214 is coupled to the transceiver unit 212. The control unit 214 chooses the parasitic antenna which has greatest RSSI to be the first parasitic antenna 120 according to the detected RSSIs between the target station 220 and the main antenna 110 combing the parasitic antenna 120, 130, 140, and 150 respectively.

Figure 4A:
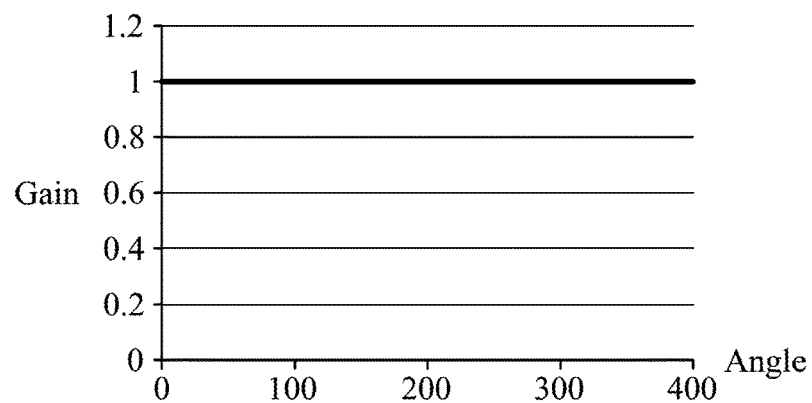
FIG. 4A~4C is an energy analysis chart of radiation pattern according to the first embodiment of the present invention.

The antenna tuning system of the present invention provides at least one switch unit to connect the parasitic antennas 120, 130, 140, and 150 individually. The processor 210 controls main the antenna 110 and the parasitic antennas 120, 130, 140, and 150 to resonate through turning on or turning off each corresponding switch unit (Step 320). As illustrated in FIG. 2A, the processor 210 makes the first switch unit 230 turns on the first parasitic antenna 120 through the first switch unit 230 connected to the first parasitic antenna 120 so as to control the main antenna 110 and the parasitic antenna 120 to resonate. In addition, the processor 210 further comprises a power unit 216, and the power unit 216 is coupled to the control unit 214. The control unit 214 of the processor 210 drives the power unit 216 to provide power to the switch unit. However, the composite radiation pattern generated by the main antenna 110 cooperating with the parasitic antennas 120, 130, 140, and 150 becomes an omni-directional antenna mode when the control unit 214 turns off all the switch units which are connected to the parasitic antennas 120, 130, 140, and 150. As illustrated in FIG. 2A, a connected signal path of the parasitic antennas 120, 130, 140, and 150 respectively is open-circuit since the corresponding switch unit is turned off. Another connected signal path of the parasitic antennas 120, 130, 140, and 150 respectively connects to an inductance unit 246 to form the effect like an AC block choke to block the sensing signal of the parasitic antenna, so as to make the parasitic antennas 120, 130, 140, and 150 be open-circuit and not connect to the designed circuit. The horizontal axis of FIG. 4A indicates angle, and the vertical axis of FIG. 4A indicates energy gain. The standard of electromagnetic wave energy gain is the energy value of the omni-directional antenna mode, so the gain is 1. From the FIG. 4A, when the composite radiation pattern generated by the main antenna 110 cooperating with the parasitic antennas 120, 130, 140, and 150 belongs to omni-directional antenna mode, the energy is the same no matter in which angle.

The antenna tuning system of the present invention further provides a designed circuit 240. The designed circuit 240 is coupled to the first parasitic antenna 120, the first switch unit 230, and a processor 210. The composite radiation pattern generated by the main antenna 110 and the first parasitic antenna 120 can be controlled through adjusting load of the designed circuit 240 (Step S330). The designed circuit 240 comprises a current-limiting resistor 242, a capacitance unit 244, an inductance unit 246, and a reactive load 248. One end of the current-limiting resistor 242 is coupled to one end of the capacitance unit 244 and one end of the inductance unit 246. Another end of the inductance unit 246 is coupled to the reactive load 248. The reactive load 248 is also coupled to the first switch unit 230. The reactive load 248 is inductive or capacitive can be preset by users, and the processor 210 controls the reactive load 248 to switch through the designed circuit 240 and the switch unit 230. The current-limiting resistor 242 allows DC signals to pass and limits the operating current and the operating voltage of the first switch unit 230. The capacitance unit 244 and the inductance unit 246 maintain DC signal level, eliminate and block the antenna operating main lobe, and eliminate and block the high harmonics generated by non-linear switch unit in order to block that the signal sensed by the parasitic antenna feeds through the path. Generally speaking, the reactive load can store energy. In the designed circuit 240 of the present invention, the reactive load is composed of a parallel connection of inductances and capacitances. Also, the DC power can pass the reactive load 248 in order to control the first switch unit 230. The reactivity can be capacitive or inductive. The impedance of the reactive load 248 affects the phase of the composite radiation pattern generated by the main antenna 110 and the first parasitic antenna 120.

In addition, an input voltage from the processor 210 to the first switch unit 230 determines that the first switch unit 230 is turned on or turned off. As illustrated in FIG. 2A, the power unit 216 of the processor 210 provides a first voltage, and the first voltage inputs from one end of the designed circuit 240. Through the design of the current-limiting resistor 242, the capacitance unit 244, and the inductance unit 246, the first voltage outputs from another end of the designed circuit 240 to one end of the first switch unit 230 indirectly. The power unit 216 of the processor 210 directly provides a second voltage to another end of the first switch unit 230. Furthermore, as described above, the DC signal can pass the reactive load 248. Therefore, in practical operation, the location of the reactive load 248 and the first switch unit 230 can be interchangeable in circuit layout. For example, the second voltage is provided to the reactive load 248, and the second voltage is also provided to the first switch unit 230 indirectly. At the same time, the power is also provided indirectly to the first switch unit 230 through the current-limiting resistor 242, the capacitance unit 244, and the inductance unit 246. The antenna tuning system of the present invention uses the processor 210 to adjust the first voltage and the second voltage in order to turn on or turn off the first switch unit 230.

Figure 4B:
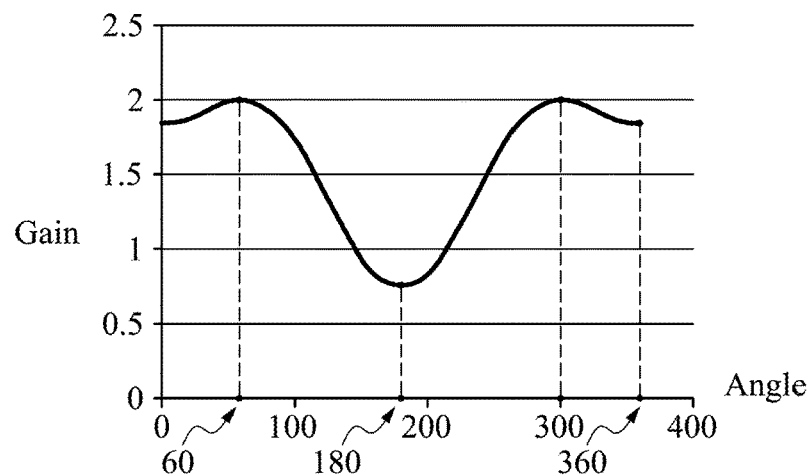

The control unit 214 of the processor 210 controls the power unit 216 to provide the first voltage and the second voltage to the first switch unit 230 in order to turn on the first switch unit 230 connected to the first parasitic antenna 120. The first voltage is indirectly provided to the first switch unit 230 through the designed circuit 240. The second voltage is directly provided to the first switch unit 230. The difference between the first voltage and the second voltage determines that the first switch unit is turned or turned off. In one embodiment, the first switch unit 230 is PIN diode. Through the difference between the first voltage and the second voltage, the switch unit 120 is turned on to conduct the reactive load 248 to a second voltage level. In the present invention, the second voltage level is a ground level, so the first parasitic antenna 120 and the reactive load 248 have a conductive path to the ground. The sensed energy of the first parasitic antenna 120 can combine with the main antenna 110. If the reactive load 248 is inductive, the composite radiation pattern generated by the main antenna 110 and the first parasitic antenna 120 belongs to an inductive load mode. Under the inductive load mode, the center profile of the radiation pattern is projected to an X-Y axis to make an energy analysis. Electromagnetic wave energy of the center profile of the radiation pattern increases from angle 0 degree, and the electromagnetic wave energy achieve a greatest value at 60 degree. Then, the electromagnetic wave energy decreases, and the electromagnetic wave energy of the center profile of the radiation pattern achieve a smallest value at 180 degree. Next, the electromagnetic wave energy increases, and the electromagnetic wave energy achieve the greatest value at 300 degree again. Next, the electromagnetic wave energy decreases until at 360 degree, illustrated as FIG. 4B.

Figure 4C:
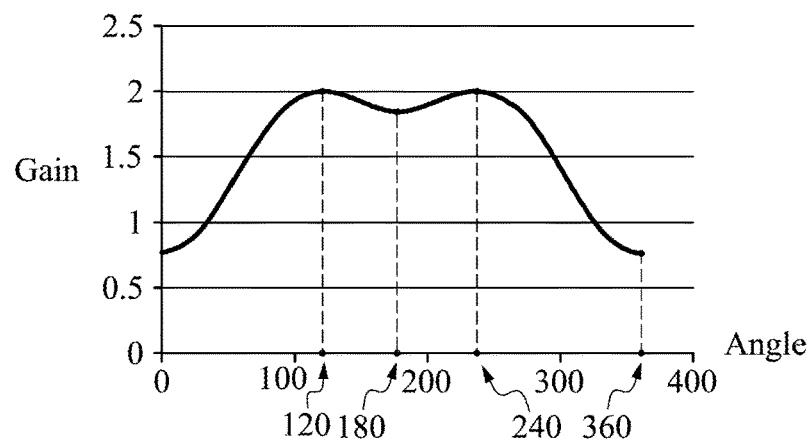

As above descriptions, if the reactive load 248 is capacitive, the composite radiation pattern generated by the main antenna 110 and the first parasitic antenna 120 belongs to a capacitive load mode. Under the capacitive load mode, the center profile of the radiation pattern is projected to an X-Y axis to make an energy analysis. The electromagnetic wave energy of the center profile of the radiation pattern is the smallest value at 0 degree. The electromagnetic wave energy increases from the degree 0, and the electromagnetic wave energy achieves the greatest value at the degree 120. Then, the electromagnetic wave energy decreases until at the degree 180. Next, the electromagnetic wave energy increases, and the electromagnetic wave energy achieves the greatest value at the degree 240 again. Next, the electromagnetic wave energy decreases until at the degree 360, and the electromagnetic wave energy achieves the smallest value at the degree 360, illustrated as FIG. 4C.

As above descriptions, there are single switch unit and single designed circuit corresponding to one parasitic antenna, furthermore, the switch unit and designed circuit can be preset by users. In other words, for the above embodiment, a default reactive load 248 (capacitive or inductive), a first switch unit 230, and a designed circuit 240 determine that the circuit is conductive or not. However, there are two different reactive loads and two switch units in the second embodiment of the present invention. For example, one of the two reactive loads is a capacitive load, and another one is inductive load. As illustrated in FIG. 2B, there are first switch unit 230, the second unit 235, the designed circuit 250, and the designed circuit 260 in the second embodiment of the present invention. The designed circuit 250 has the current-limiting resistor 252, the capacitance unit 254, the inductance unit 256, and the inductive load 258. The designed circuit 260 has the current-limiting resistor 262, the capacitance unit 264, the inductance unit 266, and the capacitive load 268.

In the second embodiment, the control unit 214 can choose the first switch unit 230 or the second switch unit 235 of the two switch units and turns on it. Accordingly, the antenna tuning system of the present invention can have the inductive load 258 and the capacitive load 268 selectively. It is worth noting that capacitive components, for example, DC block condensers 270 and 276, are installed at the connected point between the first parasitic antenna 120, the inductive load 258, and the capacitive load 268 to separates different DC control signal from the first switch unit 230 and the second switch unit 235 respectively in order to prevent the two switch units from interfering each other. Therefore, the processor 210 controls the first switch unit 230 through the first voltage and the second voltage and controls the second switch unit 235 through the third voltage and the fourth voltage in order to implement choosing or switching different property of reactive loads. For example, if the first switch unit 230 is turned off, the designed circuit 250 related to the first switch unit 230 will be turned off cause of the AC block condenser effect due to the inductance unit 256. The specific radiation pattern between the first parasitic antenna 120 and the main antenna 110 is determined by the capacitive load 268 of the designed circuit 260 corresponding to the turned on second switch unit 235.

As described above, the antenna tuning system of the present invention uses the processor 210 to provide voltage to the first switch unit 230 and the designed circuit 240 in order to turn on the first switch unit 230, so as to make the main antenna 110 and the first parasitic antenna 120 be resonated. The radiation pattern between the main antenna 110 and the first parasitic antenna 120 has different energy distribution according to the different load of the circuit elements of the designed circuit 240. Therefore, the antenna tuning system of the present invention chooses which parasitic antenna to resonate with the main antenna according to the target station's position. The antenna tuning system make the highest energy part of the radiation pattern aim at the target station in order to let the target station have the best communication quality. The antenna tuning system make the lowest energy part of the radiation pattern aim at the rogue stations in order to avoid the unnecessary communication interference.

The present invention provides an antenna tuning system. The antenna tuning system uses all kinds of inductive and capacitance load design to form different resonance effect in order to generate different radiation patterns. Accordingly, a specific radiation pattern can concentrate energy in the direction of a target station in order to avoid wasting energy on the station that is not allowed to send or the rogue stations.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An antenna tuning system, adapted for adjusting a composite radiation pattern generated by a main antenna cooperating with at least one parasitic antenna, wherein the antenna tuning system comprises:

a processor, connected to the main antenna and each of the at least one parasitic antenna, wherein the processor chooses a first parasitic antenna of the at least one parasitic antenna, wherein a greatest received signal strength indicator (RSSI) is detected between a target station and the first parasitic antenna cooperating with the main antenna, and wherein the processor comprises:

a transceiver unit, detecting the RSSI between the antenna tuning system and the target station individually;

a control unit, coupled to the transceiver unit, wherein the control unit chooses the first parasitic antenna according to the RSSI, and the control unit also controls a first switch unit which is connected to the first parasitic antenna to turn on the first parasitic antenna, so as to control the main antenna and the first parasitic antenna to resonate; and a power unit, wherein the control unit drives the power unit to provide power to the switch unit;

at least one designed circuit, connected to the at least one parasitic antenna individually, wherein the designed circuit is connected to the processor, and the designed circuit controls the composite radiation pattern generated by the main antenna cooperating with the parasitic antenna; and at least one switch unit, connected to the at least one designed circuit individually and connected to the processor, wherein the processor controls the switch unit to turn on or turn off the connection between the designed circuit and the corresponding parasitic antenna of the designed circuit;

wherein the at least one designed circuit comprises:
a reactive load, wherein the control unit controls the power unit to provide a first voltage and a second voltage to the switch unit in order to control the switch unit, the first voltage is indirectly provided to the switch unit through the designed circuit, the second voltage is directly provided to the switch unit and whether the switch unit is turned on or turned off is determined by the first and the second voltage, when the reactive load is an inductive load, the composite radiation pattern belongs to an inductive load mode.

2. The antenna tuning system of claim 1, wherein the composite radiation pattern generated by the main antenna cooperating with parasitic antennas being dumb or inactive becomes an omni-directional antenna mode when all the control units turn off all the switch units which are connected to the respective parasitic antennas.

3. An antenna tuning method, adapted for adjusting a composite radiation pattern generated by a main antenna cooperating with at least one parasitic antenna, wherein the antenna tuning method comprises the following steps:

choosing a first parasitic antenna of the at least one parasitic antenna, wherein a greatest RSSI is detected between a target station and the first parasitic antenna cooperating with the main antenna;

providing at least one designed circuit, connecting to the at least one parasitic antenna individually, wherein the designed circuit controls the composite radiation pattern generated by the main antenna cooperating with the parasitic antenna;

providing at least one switch unit, connected to the at least one designed circuit individually, and controlling the switch unit to turn on or turn off the connection between the designed circuit and the corresponding parasitic antenna of the designed circuit, driving a power unit to provide power to the switch unit in order to control the switch unit to turn on or turn off the connection between the designed circuit and the corresponding parasitic antenna of the designed circuit;

providing a reactive load to the designed circuit; and providing a first voltage and a second voltage from the power unit to the switch unit to control the switch unit, wherein the first voltage is indirectly provided to the switch unit through the designed circuit, the second voltage is directly provided to the switch unit, and whether the switch unit is turned on or turned off is determined by the first and the second voltage;

wherein:
when the reactive load is an inductive load, the composite radiation pattern generated by the main antenna cooperating with the parasitic antenna belongs to an inductive load mode; and when the reactive load is a capacitive load, the composite radiation pattern generated by the main antenna cooperating with the parasitic antenna belongs to a capacitive load mode.

4. The antenna tuning method of claim 3, wherein the composite radiation pattern generated by the main antenna cooperating with each of the at least one parasitic antenna becomes an omni-directional antenna mode if turning off all switch units.

5. An antenna tuning system, adapted for adjusting a composite radiation pattern generated by a main antenna cooperating with at least one parasitic antenna, wherein the antenna tuning system comprises:

a processor, connected to the main antenna and each of the at least one parasitic antenna, wherein the processor chooses a first parasitic antenna of the at least one parasitic antenna, wherein a greatest received signal strength indicator (RSSI) is detected between a target station and the first parasitic antenna cooperating with the main antenna, and wherein the processor comprises:

a transceiver unit, detecting the RSSI between the antenna tuning system and the target station individually;

a control unit, coupled to the transceiver unit, wherein the control unit chooses the first parasitic antenna according to the RSSI, and the control unit also controls a first switch unit which is connected to the first parasitic antenna to turn on the first parasitic antenna, so as to control the main antenna and the first parasitic antenna to resonate; and a power unit, wherein the control unit drives the power unit to provide power to the switch unit;

at least one designed circuit, connected to the at least one parasitic antenna individually, wherein the designed circuit is connected to the processor, and the designed circuit controls the composite radiation pattern generated by the main antenna cooperating with the parasitic antenna; and at least one switch unit, connected to the at least one designed circuit individually and connected to the processor, wherein the processor controls the switch unit to turn on or turn off the connection between the designed circuit and the corresponding parasitic antenna of the designed circuit;

wherein the at least one designed circuit comprises:
a reactive load, wherein the control unit controls the power unit to provide a first voltage and a second voltage to the switch unit in order to control the switch unit, the first voltage is indirectly provided to the switch unit through the designed circuit, the second voltage is directly provided to the switch unit, and whether the switch unit is turned on or turned off is determined by the first and the second voltage, when the reactive load is a capacitive load, and the composite radiation pattern belongs to a capacitive load mode.

6. The antenna tuning system of claim 5, wherein the composite radiation pattern generated by the main antenna cooperating with parasitic antennas being dumb or inactive becomes an omni-directional antenna mode when all the control units turn off all the switch units which are connected to the respective parasitic antennas.

* * * * *